(12) United States Patent
Schuster et al.

(10) Patent No.: US 6,245,242 B1
(45) Date of Patent: Jun. 12, 2001

(54) CLEANUP OF NITROAROMATICS-CONTAINING WASTEWATERS

(75) Inventors: Ludwig Schuster, Limburgerhof; Hanns-Helge Stechl, Mannheim; Dietrich Wolff, Plankstadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1220 days.

(21) Appl. No.: 08/603,197

(22) Filed: Feb. 20, 1996

Related U.S. Application Data

(63) Continuation of application No. 08/178,628, filed on Jan. 7, 1994, now abandoned, which is a continuation of application No. 07/900,780, filed on Jun. 22, 1992, now abandoned, which is a continuation-in-part of application No. 07/697,509, filed on May 3, 1991, now abandoned, which is a continuation of application No. 07/457,884, filed on Dec. 27, 1989, now abandoned.

(30) Foreign Application Priority Data

Jan. 14, 1989 (DE) .................................................. 39 009 32

(51) Int. Cl.⁷ ........................................................ C02F 1/78
(52) U.S. Cl. ........................... 210/760; 210/903; 210/909
(58) Field of Search ..................................... 210/758, 759, 210/760, 766, 909, 903

(56) References Cited

U.S. PATENT DOCUMENTS

| | | | | |
|---|---|---|---|---|
| 1,341,913 | * | 6/1920 | Leggett | 210/909 |
| 2,703,312 | * | 3/1955 | Hann et al. | 210/760 |
| 4,197,198 | * | 4/1980 | Watson et al. | 210/909 |
| 4,604,214 | * | 8/1986 | Carr et al. | 210/909 |
| 4,804,480 | * | 2/1989 | Jayawant | 210/763 |
| 4,915,842 | * | 4/1990 | Kearney et al. | 210/760 |
| 5,124,051 | * | 6/1992 | Bircher et al. | 210/760 |

OTHER PUBLICATIONS

Caprio et al., *Ozone: Science and Eng.*, vol. 6, pp. 115–121, 1984.
M.A. Shevchenko Khim., Tekhnol. Vody, 8 (6). 7–10, 1986.
*Chemical Abstracts* (I) 102:172028 (1985).
*Chemical Abstracts* (II) 108:26755 (1988).
*Chemical Abstracts* (III) 102:225752 (1985).
*Chemical Abstracts* (IV) 102:154316 (1985).
Grunbein, Chemie Ingenieur Technik 46(8) p. 339 (Apr. 1974).

\* cited by examiner

*Primary Examiner*—Peter A. Hruskoci
(74) *Attorney, Agent, or Firm*—Keil & Weinkauf

(57) ABSTRACT

Aromatic nitro compounds in waste waters from nitrobenzene production plants are degraded by treatment with ozone at 60–100° C. 1.5–10 bar and pH 3 to 12.

5 Claims, No Drawings

CLEANUP OF NITROAROMATICS-CONTAINING WASTEWATERS

This application is a continuation of application Ser. No. 08/178,628, filed on Jan. 7, 1994, now abandoned which is a continuation of application Ser. No. 07/900,780, filed on Jun. 22, 1992, now abandoned which is a continuation in-part of application Ser. No. 07/697,509, filed on May 3, 1991, now abandoned which is a continuation of U.S. Ser. No. 07/457,884, filed on Dec. 27, 1989 now abandoned.

The present invention relates to the ozone treatment of waste waters from the production of nitro-benzene from benzene and nitrating acid.

The literature discloses very many studies concerned with the degradation of organic compounds by ozone. These studies concentrate in the main on the kinetics and the decomposition products.

A large number of papers are further concerned with the pretreatment of tap and process water. The usual aim here is to kill off the pathogens, whether they are viruses, bacteria or other single-cell organisms.

Another extensive field concerns the treatment of industrially contaminated wastewater. A treatment with ozone is applied here in particular if there is insufficiently biodegradable or non-biodegradable matter in the water. This method of prior partial ozonolysis thus degrades organic compounds to a state where they are vulnerable to attack by bacteria (E. Gilbert, Water Res., 21 (10) 1273–8; D. R. Medley, J. Water Pollut. Control Fed., 55 (5) 489–94).

If, then, the wastewater contains nitrophenols, the combined application of various treatment methods such as coagulation, sedimentation, ozonation and adsorption on activated carbon is recommended (M. A. Shevchenko, Khim., Tekhnol. Vody, 8 (6), 7–10).

We have found, surprisingly, that waste waters from nitrobenzene production by nitration of benzene which contain various aromatic compounds but in the main 2,4-dinitrophenol can be cleaned up by the treatment with ozone alone at from 20 to 100° C., preferably at from 20 to 60° C., at from 1.5 to 10 bar absolute, preferably at from 1.5 to 5 bar absolute, and at a pH of from 3–12, essentially at pH 7–9, to such an extent that the levels of the original contaminants are reduced to below their limits of detection.

At the start of the oxidation the solution to be oxidized is in general at pH 12. In the course of the ozonation the pH decreases, but it should not drop below pH 4.5 as long as significant amounts of nondegraded dinitriphenol are still present, since otherwise the dinitrophenol is precipitated. The preferred pH range is from 7 to 9.

The reaction pressure is advantageously adjusted to 1.5–10, preferably 1.8–5, bar. This is because of the elevated reaction temperature at which ozone is only very slightly soluble, if at all. It is therefore advisable to aim at least for a certain increase in the solubility. Furthermore, the ozone yield of the ozone generators increases under superatmospheric pressure. It is therefore fore advisable also to maintain this pressure in the reactor. For reasons of apparatus construction, however, the pressure is usually limited to an upper value of 10 bar.

The ozone-containing gas must usefully be dispersed very finely and intensively in order to compensate for the low solubility of the ozone. The method used to obtain the very fine dispersion of the gas may make use of any desired aid, for example finely dispersing stirrers, ultrasonics, gas frits or customary injectors.

To carry out the process in a continuous manner, it is preferable to employ a cascade of reactors connected in countercurrent. This ensures that removal of ozone from the gas stream is so complete that it is usually possible to dispense with a residual ozone destruction stage.

The ozone content of the fresh gas should be as high as possible on account of the low solubility of ozone in water at elevated temperature. Levels of from 40 to 100 g of ozone per cubic meter of fresh gas have been found to be still easy to prepare on an industrial scale. By employing specific enrichment methods, for example an adsorption-desorption technique, it is also possible to obtain still higher ozone concentrations.

The process according to the present invention is used in particular for treating the wastewater from a nitrobenzene production plant. Since, however, nitrobenzene is also used for extracting residual amounts of aniline from the wastewater of the process for producing aniline from nitrobenzene, and the resulting waste waters can be subjected together to the ozone treatment, the water which is to be treated may also contain aniline, which is likewise degraded by ozone. Only inorganic compounds are produced according to the process of this invention.

EXAMPLE 1

A 2.5 l capacity pressure-resistant vessel equipped with a high-speed stainless steel stirrer was charged with 1.5 l of a nitrobenzene plant wastewater containing 0.5 ppm of benzene, 10 ppm of nitrobenzene, 5 ppm of aniline, 2800 ppm of sodium 2,4-dinitrophenolate and 65 ppm of sodium picrate. Small amounts of inorganic salts such as sodium nitrate are also present. After acidification to pH 5 and heating to 87° C., 120 standard liters of ozone-containing oxygen were introduced per hour under a pressure of 2.2 bar, corresponding to an ozone rate of 7.2 g of $O_3$/hour. Over the next 2 hours the ozone content of the waste gas rose from 5 g/m$^3$ to about 50 g/m$^3$. The pH continuously decreased to pH 3 in the course of the reaction.

The organic compounds previously present therein were virtually completely destroyed; the amounts were below the limit of detection.

The analyses were carried out by HPLC after prior extractive concentrating.

| Results | |
|---|---|
| Benzene | <30 ppb |
| Nitrobenzene | <20 ppb |
| Aniline | <20 ppb |
| Sodium dinitrophenolate | <10 ppb |
| Sodium picrate | <10 ppb |

The total carbon content fell from 0.11% to <0.01%.
The total nitrogen content fell from 0.052% to 0.02%.

EXAMPLE 2

A 2.5 l capacity vessel equipped with a high-speed stainless steel stirrer was charged with 2 l of a nitrobenzene plant wastewater containing 0.5 ppm of benzene, 10 ppm of nitrobenzene, 5 ppm of aniline, 2800 ppm of sodium 2,4-dinitrophenolate and 65 ppm of sodium picrate. Small amounts of inorganic salts such as sodium nitrate were also present. Ozone was introduced at 40° C. with thorough stirring by introducing 120 l per hour of oxygen containing 180 g of ozone per cubic meter. This rate corresponds to 21.6 g of ozone per hour. 35 minutes later no detectable concentration of aromatic compound was left. After 50 minutes, the TOC value had dropped to 4 mg/l.

We claim:

1. A process for degrading aromatic nitro compounds in wastewaters from nitrobenzene production plants which consists essentially of treating said wastewaters containing aromatic nitro compounds with ozone, in an amount sufficient to virtually completely destroy said aromatic nitro compounds down to inorganic components, at 20 to 100° C., 1.5 to 10 bar and pH 7 to 9.

2. A process as claimed in claim 1, wherein the ozonation is carried out at 20 to 60° C. and 1.5 to 5 bar.

3. A process for degrading aromatic nitro compounds in wastewaters from nitrobenzene production plants by reaction with ozone, in an amount sufficient to virtually completely destroy said aromatic nitro compounds, wherein the degradation reaction, at a temperature of from 20 to 100° C. and a pressure of from 1.5 to 10 bar absolute, is started at pH 12 and the pH level is maintained above pH 4.5 until the reaction is completed.

4. The process of claim 3 wherein the pH level is maintained in the range of pH 7 to 9.

5. The process of claim 3 wherein the reaction temperature is 20 to 60° C.

\* \* \* \* \*